United States Patent [19]

Habermas

[11] 4,302,335
[45] Nov. 24, 1981

[54] RECONDITIONING OF PHOSPHATE ESTER HYDRAULIC CONTROL FLUIDS

[75] Inventor: Robert E. Habermas, Northville, Mich.

[73] Assignee: The Detroit Edison Company, Detroit, Mich.

[21] Appl. No.: 121,010

[22] Filed: Feb. 13, 1980

[51] Int. Cl.³ ............................................. B01D 15/00
[52] U.S. Cl. ................................... 210/651; 210/669; 210/689; 210/806; 210/167; 210/266
[58] Field of Search ...................... 210/23 R, 23 F, 27, 210/39, 41, 73 R, 73 W, 167, 168, 266, 314, 317, 318, DIG. 5, 651, 689, 806, 251, 252, 257.1, 258, 259, 663, 669; 252/75, 78.5, 49.8, 49.9; 260/966, 990

[56] References Cited

U.S. PATENT DOCUMENTS

| | | | |
|---|---|---|---|
| 2,373,807 | 4/1945 | Beeg et al. | 260/990 |
| 3,224,845 | 12/1965 | Thomas | 210/41 |
| 3,312,351 | 4/1967 | Kasten | 210/DIG. 5 |
| 3,394,812 | 7/1968 | Cohen et al. | 210/167 |
| 3,649,721 | 3/1972 | Burrous et al. | 260/990 |

Primary Examiner—Ivars C. Cintins
Attorney, Agent, or Firm—Whittemore, Hulbert & Belknap

[57] ABSTRACT

A method and apparatus for recovering or maintaining phosphate ester type hydraulic fluids in serviceable condition which comprises sequentially filtering the fluid through at least a coalescer type filter and a molesieve type filter, preferably in conjunction with an activated charcoal powder filter and a small pore particle filter. In maintaining a hydraulic system in service, a small quantity of the hydraulic fluid is continually circulated from a reservoir through the filters and returned to the reservoir.

11 Claims, 1 Drawing Figure

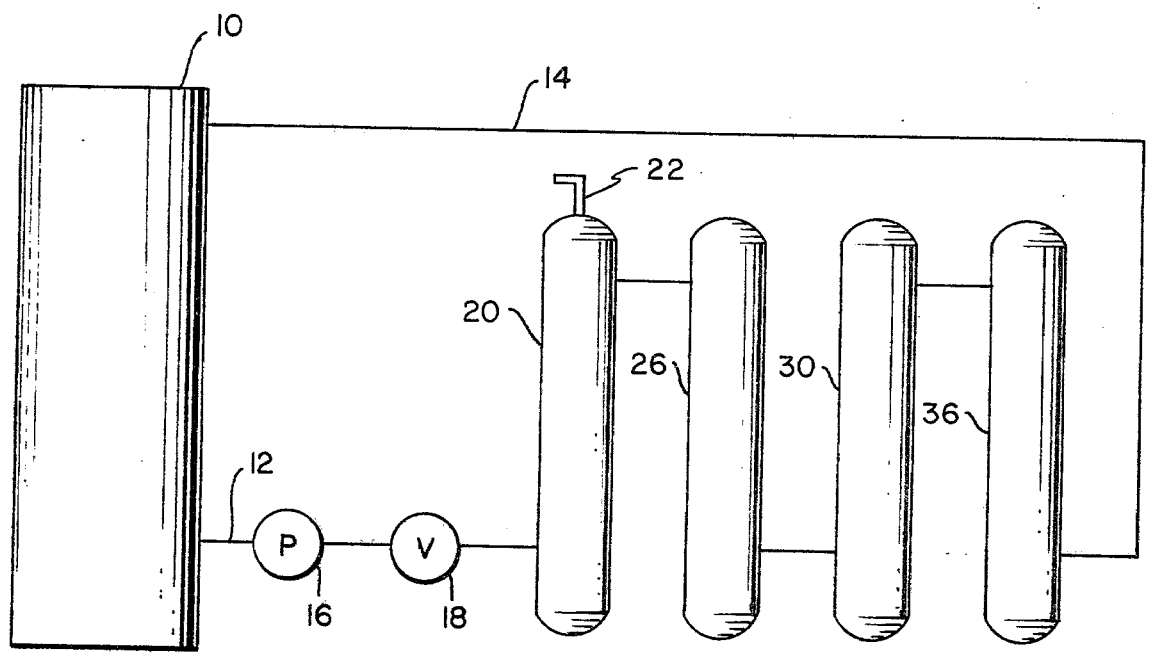

RECONDITIONING OF PHOSPHATE ESTER HYDRAULIC CONTROL FLUIDS

BRIEF SUMMARY OF THE INVENTION

The present invention relates to treatment of phosphate ester type hydraulic fluid of the type used almost exclusively in hydraulic control systems and more particularly electro-hydraulic control systems on large turbine-generators.

Hydraulic fluids of this type may be treated to restore them to a condition in which they meet original commercial specification by filtering them through a succession of specifically selected filters. A control system in which phosphate ester hydraulic fluids are provided in a reservoir may be kept in continuous service by continually providing a by-pass circulation of a small amount of fluid from the reservoir through a particular sequence of filters and returned to the reservoir.

BRIEF DESCRIPTION OF THE DRAWING

The FIGURE is a diagrammatic illustration of the system including the reservoir and filters.

DETAILED DESCRIPTION

A hydraulic fluid to which the present invention has been applied is a hydraulic fluid manufactured by Stauffer Chemical Company of Westport, Connecticut. This hydraulic fluid is of the phosphate ester type and more particularly tricresyl phosphate ester. This fluid is sold under the tradename Fyrquel 220.

It has been found that excess water which may be present in this hydraulic fluid has an adverse effect on heated phosphate ester fluids. More specifically it has been found in the power industry where the fluid is used in electro-hydraulic control systems, that the rate of corrosion and/or erosion of servo-valves is greatly accelerated when the hydraulic fluid is contaminated with more than 0.2% water, and it is preferred to maintain the water content below the 0.1%. Phosphate ester hydraulic fluids of this type will hydrolyze with water to form corrosive materials such as phenols, cresols, and cresylic acids.

Referring now to the drawing, there is illustrated a tank or reservoir 10 containing hydraulic fluid for use in an electro-hydraulic control system, such for example as used on large turbine-generators.

In order to keep the system in continuous operation there is provided a by-pass flow from and return to the system by conduits 12 and 14. A pump 16 is provided in the filter system and the rate of flow of hydraulic fluid through the filter system may be adjusted by a suitable control valve indicated diagrammatically at 18. The quantity of hydraulic fluid withdrawn from the reservoir and circulated through the filters is between 0.1% and 1.0% of the volume of hydraulic fluid in the reservoir per minute. Excellent results have been obtained when the rate of circulation is approximately 1 gal. per minute for reservoirs containing from 300 to 400 gal. of hydraulic fluid.

It will of course be understood that this bypass flow of hydraulic fluid for maintaining the hydraulic fluid in the reservoir in serviceable condition is at a rate which is independent of the flow of hydraulic fluid from and to the reservoir for operation of the control system.

It is required that certain of the filters in the filter system be provided in a particular sequence. The first filter indicated at 20 is a coalescer filter provided with a water drain 22 at the top. Coalescer filters are capable of removing water from hydraulic fluids and may reduce the water content to less than 0.15%. Filters of this type operating to remove water from the hydraulic fluid cause the suspended droplets to coalesce into larger droplets which are displaced by the heavier phosphate ester hydraulic fluid to the top of the filter where the water can be continuously removed through a drain connection illustrated at 22.

A coalester filter which has been found entirely satisfactory for this service is model VFCS-294-223-A manufactured by Facet Enterprise of Tulsa, Oklahoma.

The hydraulic fluid after the water content has been reduced by the coalescer type filter is thereafter filtered through a mole-sieve filter indicated at 26, which receives the hydraulic fluid after it has been treated by the coalescer filter 20. The mole-sieve filter is capable of reducing water content of the hydraulic fluid to an exceptionally low value and in a practical embodiment of the invention a water concentration in the fluid was reduced to 0.01%. At two installations the mole-sieve filter reduced the chlorine content of the hydraulic fluid from 474 ppm to 37 ppm, and from 608 ppm to 68 ppm respectively. The mole-sieve type filter has also been found in one installation to reduce the acid neutralization number from 0.36 to 0.14.

A suitable mole-sieve filter which has been used in a successful practice of the present invention is type 4A, 5A or 13X mole-sieve manufactured by Linde Air Products Company and assembled into a filter model SFP-2-MSX by Special Fluid Products, Inc., of Farmington Hills, Michigan.

It is desirable in reconditioning the hydraulic fluid to remove particulate matter and also in some cases to restore the original color. For these purposes a filter 30 containing activated charcoal powder is provided and a fourth filter 36 constituting a 1 micron polishing filter is provided which removes any remaining particulate material.

The present invention has been found effective to remove water, acid and chlorine concentrations sufficient to restore phosphate ester hydraulic fluids to serviceable conditions without taking the turbine out of service. While the system as so far described is intended as an adjunct to an electro-hydraulic control servo-system, it will of course be apparent that the system of filters may be provided as a portable assembly and applied to a hydraulic fluid reservoir only when required to restore the hydraulic fluid to its original and at least a serviceable condition. Similarly it will be apparent that the system of filters may be provided for the more general purpose of restoring any phosphate ester type hydraulic fluids to original or serviceable condition.

The present invention is particularly useful because continual use of hydraulic fluid having a water content in excess of 0.2% will hydrolize to form corrosive material such as phenols, cresols and cresylic or other organic acids. In addition it has been found that over a period of service, the hydraulic fluid can be contaminated by chlorine or chlorine compounds as well as particulate matter of various types.

At one installation in which the filters were provided in a by-pass circulation system connected to a hydraulic fluid reservoir, the coalescer type filter reduced the concentration of water in a phosphate ester hydraulic fluid from 3% to 0.15%. A mole-sieve filter further reduced the acid concentration number from 0.36 to an acceptable 0.14, with a substantial further reduction in water content.

At a second installation in which the filters were provided in a by-pass circulation system connected to a hydraulic fluid reservoir, the coalescer type filter reduced the water content to 0.10% and left a chlorine content of 234 ppm. A mole-sieve filter further reduced the water concentration to 0.01% and the chlorine concentration was reduced to 170 ppm.

Prior to the present invention, accidental severe contamination by contaminants including water, of phosphate ester hydraulic fluid used in digital electro-hydraulic control systems for large turbine-generators required removing the turbine-generator from service, draining the hydraulic system and flushing it with several fillings of new hydraulic fluid. Thereafter, since the draining and repeated flushing had not removed all contaminants and particularly had reduced the water content only to 0.29%, it was further reduced to a barely acceptable 0.20% by removing as much hydraulic fluid as possible (approximately 55 gallons) while the unit was running and refilling with new fluid.

This represents a substantial loss due to the time the unit was out of service, as well as the cost of the new hydraulic fluid.

I claim:

1. Apparatus for keeping a turbine-generator having an electro-hydraulic control system in service indefinitely without requiring shut down because of contaminated phosphate ester hydraulic fluid, which comprises: a hydraulic system for supplying hydraulic fluid in serviceable condition to the electro-hydraulic control system, the hydraulic system including a reservoir for the hydraulic fluid, a by-pass renewal fluid circuit comprising intake and return connections to spaced locations at said reservoir, pump means for maintaining a continuous by-pass flow through said by-pass circuit independent of the withdrawal and return flow of hydraulic fluid from and to the reservoir for operation of the control system, said circuit comprising a plurality of different filters arranged in series in said circuit adapted to maintain the water content of the fluid in the reservoir below 0.20% by volume, the first filter through which the fluid passes being a coalescer type filter to reduce the water content of the fluid, and a subsequent filter being of the mole-sieve type to further reduce the water content of the fluid to less than 0.20% by volume.

2. A system as defined in claim 1, in which the hydraulic fluid is a phosphate ester.

3. A system as defined in claim 2, in which said filters include a filter of activated charcoal powder.

4. A system as defined in claim 2, in which said filters include an approximately 1 micron particulate filter.

5. A system as defined in claim 1, in which said filters include a filter of activated charcoal powder.

6. A system as defined in claim 1, in which said filters include an approximately 1 micron particulate filter.

7. A system as defined in claim 1, in which the pump means has a flow capacity of about 0.1–1.0% the reservoir capacity per minute.

8. The method of keeping an installation including a hydraulic system using a phosphate ester hydraulic fluid and including a fluid reservoir in continuous service, which comprises substantially continuously withdrawing fluid from the reservoir, filtering the withdrawn fluid successively through a coalescer type filter and a mole-sieve type filter, and returning the filtered fluid to the reservoir.

9. The method of claim 8 which comprises providing a circulation through the filters of 0.1–1.0% of the volume of the reservoir per minute.

10. The method of claim 9, which comprises further filtering the fluid after filtration by the mole-sieve filter by a filter of activated charcoal powder and a particle filter.

11. The method of keeping a turbine-generator having a reservoir for phosphate ester hydraulic fluid, an electro-hydraulic control system, and connections to supply fluid from the reservoir to the control system in service indefinitely without requiring shut down because of contaminated phosphate ester hydraulic system, which comprises maintaining the water content of the fluid in the reservoir below 0.20% by volume, maintaining the chlorine content below about 170 ppm, and maintaining the acid neutralization number below about 0.14, by continuously withdrawing fluid from the reservoir and establishing a by-pass flow of fluid successively through a coalescer type filter and a mole-sieve filter, and maintaining the by-pass flow of the withdrawn fluid independent of the withdrawal and return flow of the hydraulic fluid from and to the reservoir for operation of the control system in an amount of 0.1–1.0% of the reservoir capacity per minute.

* * * * *